UNITED STATES PATENT OFFICE.

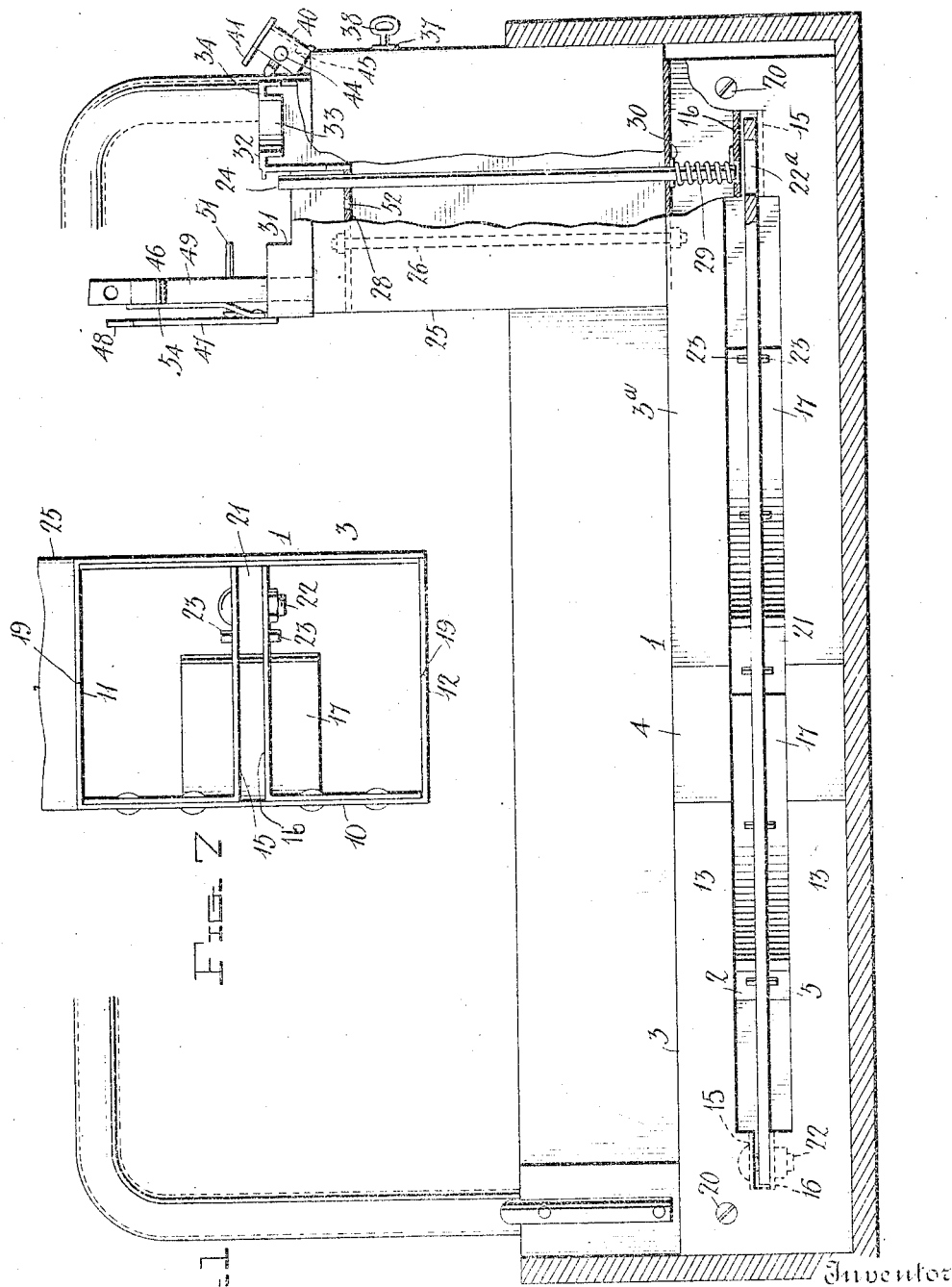

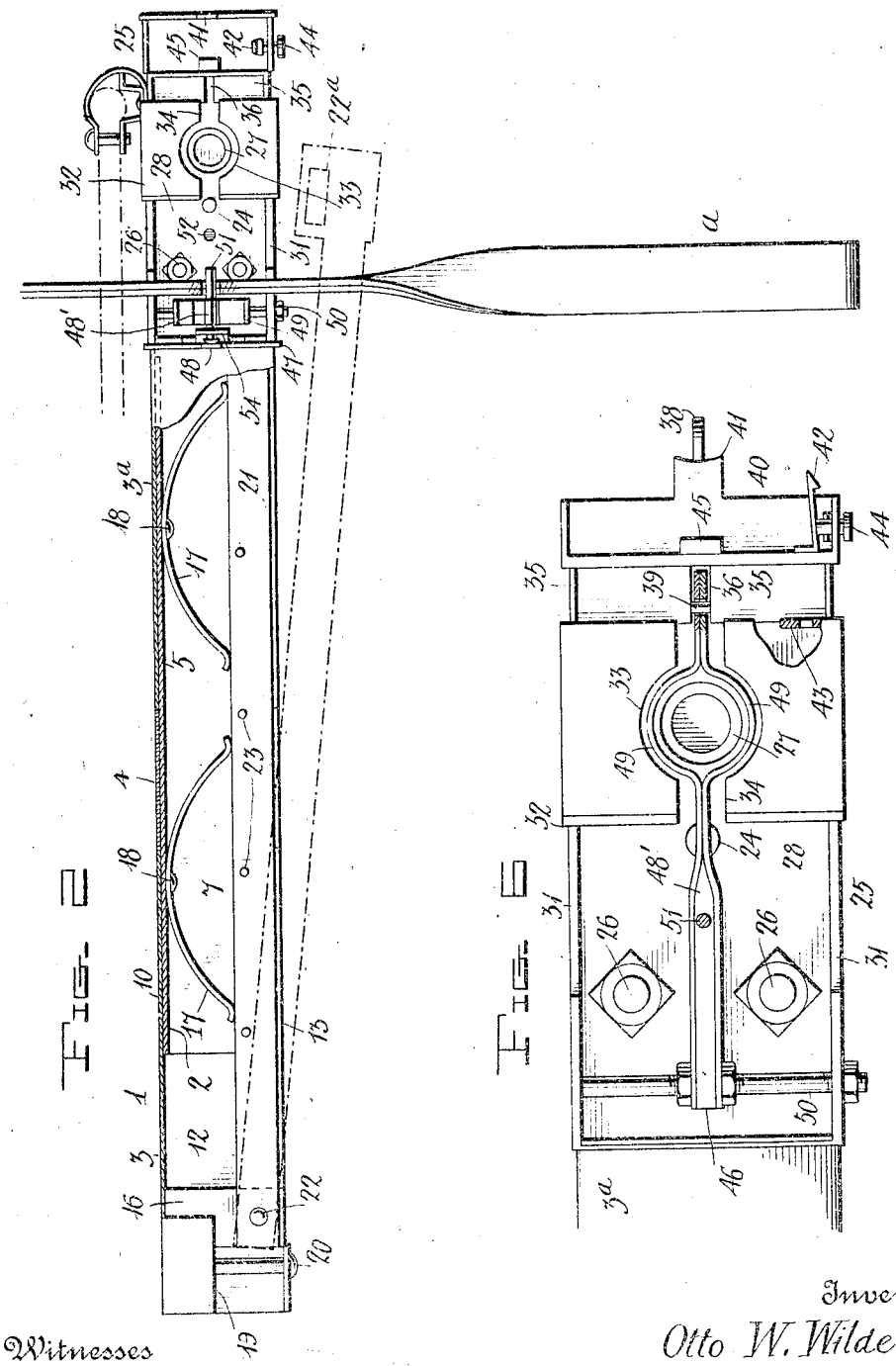

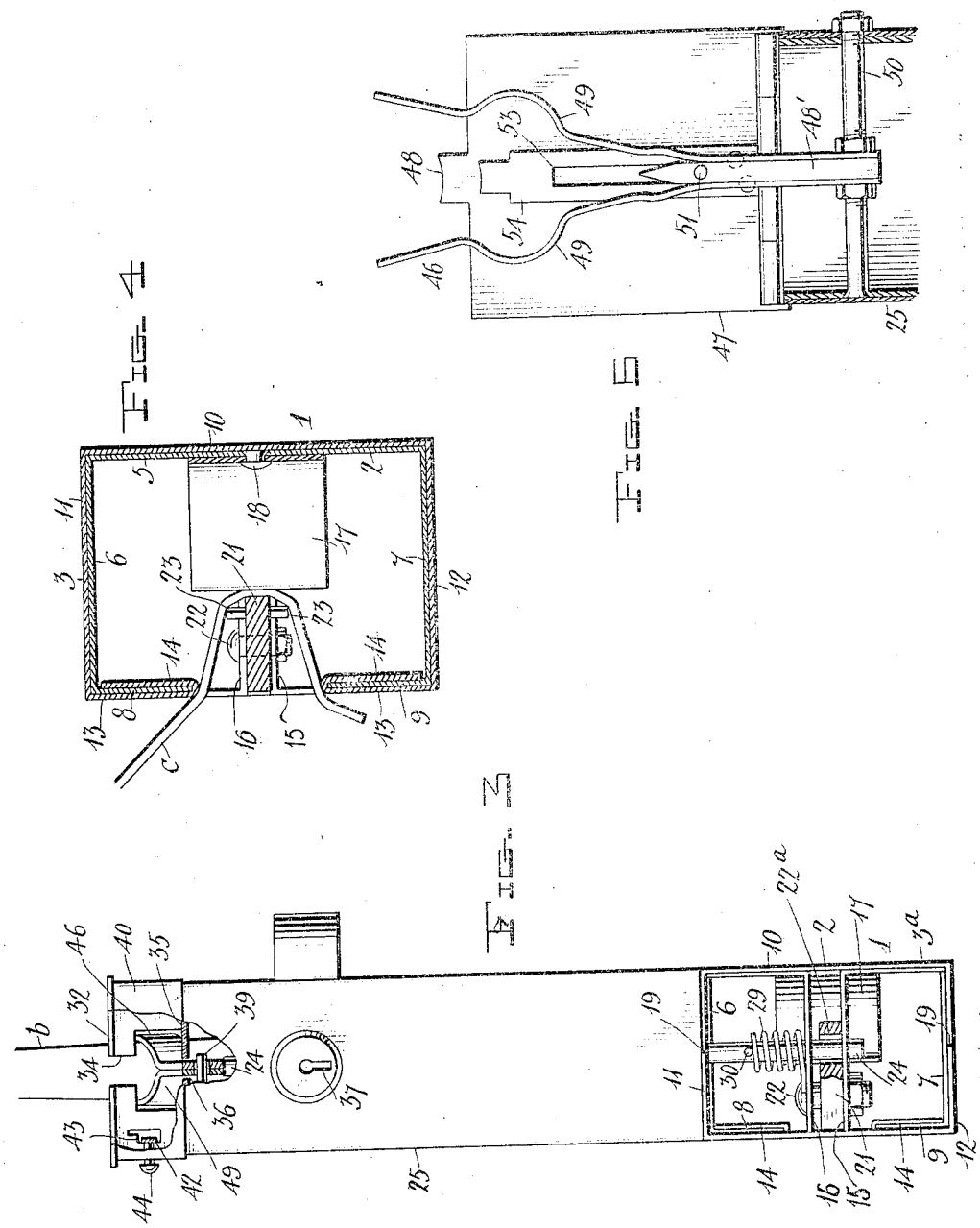

OTTO W. WILDE, OF WICHITA, KANSAS.

COMBINED WHIP, REIN, AND LAP ROBE LOCK FOR VEHICLES.

No. 877,823.   Specification of Letters Patent.   Patented Jan. 28, 1908.

Application filed December 3, 1906. Serial No. 346,128.

*To all whom it may concern:*

Be it known that I, OTTO W. WILDE, a citizen of the United States, residing at Wichita, in the county of Sedgwick and State of Kansas, have invented certain new and useful Improvements in a Combined Whip, Rein, and Lap Robe Lock for Vehicles; and I do declare the following to be a full, clear, and exact description of the invention, such as will enable others skilled in the art to which it appertains to make and use the same.

My invention is an improved combined whip, rein and lap robe lock for buggies and other vehicles to prevent the whip and reins from being used by an unauthorized person, and to also prevent unauthorized removal of the lap robe from the vehicle, and it consists in the construction, combination and arrangement of devices hereinafter described and claimed.

In the accompanying drawings,—Figure 1 is partly an elevation and partly a longitudinal sectional view of a combined whip, rein and lap robe lock embodying my invention; Fig. 2 is a top plan view of the same, with the lid of the casing which contains the whip socket open, and the bottom base bar shown partly in horizontal section, to disclose the lap robe locking bar and the releasing springs, said bar being shown in locked position in full lines and in unlocked position in dotted lines. Fig. 3 is partly an end elevation and partly a transverse sectional view of the same; Fig. 4 is a detail transverse sectional view of the bottom base bar, the lap robe locking bar and one of the releasing springs, said locking bar being shown in locked position. Fig. 5 is a similar view, showing the upper portion of the casing, and in which the lid of the casing is shown in its vertical, open position, together with the devices which are connected thereto. Fig. 6 is a detail top plan view of the casing, omitting the lid and showing the whip clamping spring in closed position, said casing and said spring being shown partly in section and the rein locking stud being also shown in section, and Fig. 7 is a detail end elevation of the hollow base bar, and showing the lap robe locking bar and one of the releasing springs.

The cross-bar 1, which forms the base of my improved combined whip, rein and lap-robe lock comprises an inner section 2, end sections 3 and 3ᵃ, which are telescopically secured to and slidable thereon, and one or more intermediate or filler sections 4, which are disposed between the end sections and are slidable on and removable from the inner section. The latter is here shown as hollow and is made of sheet metal bent to form a vertical front web 5, top 6, bottom 7, and flanges 8, 9, bent from the rear ends of the top and bottom and projecting inwardly therefrom and forming a space between them. Each of the end sections is also made of a piece of sheet metal, bent to form a web 10, top 11, bottom 12, outer flanges 13 to bear against the outer sides of the flanges 8, 9, and inner flanges 14, bent to bear against the inner side of said flanges 8, 9. The said end sections are placed on the inner sections, as shown in detail in Fig. 4. The said end sections are respectively provided near their outer ends with pairs of cross bars 15, 16, disposed one above the other and spaced therefrom. The intermediate or filler section or sections 4 is or are of the same construction as the end sections, excepting that it is shorter and is not provided with cross bars.

In the inner section 2, near the ends thereof, are curved springs 17, each of which is secured at its center, as at 18, against the front wall or web of said inner section, and the ends of the said springs are disposed opposite the longitudinal opening formed between the flanges of the inner, end and intermediate sections. Each of the end sections has its front corners cut away at its upper and lower sides, as at 19, to clear the standards in the front corners of the buggy or other vehicle bed or body, and said end sections are secured to the vehicle body in the bottom thereof by bolts or screws 20. By having the base bar of the inner and the outer end sections telescopically related, said base is adapted to be longitudinally adjusted, as may be required, to adapt it to fit in vehicle bodies of various widths. The filler or intermediate section or sections is or are employed to fill in the spaces between the end sections to present a sightly appearance.

A lap robe lock bar 21 has one end pivotally mounted, as at 22, between the cross bars 15 and 16 of the end section 3. Said lap robe lock bar is provided at suitable distances apart with upwardly and downwardly-extending points 23 to engage a lap robe when the latter has its lower portion doubled over the front side of the said bar. The said bar is adapted to be turned so as to enter the hollow base bar through the opening or slot formed in the rear side thereof, between the flanges of its respective sections, and hence is caused to force the lower portion of the laprobe partly into the said hollow base bar and cause it to be compressed between the upper and lower sides of said lock bar and the opposing edges of said flanges. This also causes the points to engage the fabric of the laprobe, and when the bar is secured in place in the hollow base bar by the means hereinafter described, it will be understood that it serves to firmly lock the lap robe to the said base bar, so that the lap robe cannot be removed therefrom. As the lock bar 21 is pressed into the hollow base bar, it engages the ends of the springs 17 and must be pressed into said hollow base bar against the resistance of said springs. The latter when the bar 21 is released by the locking mechanism serves to turn the said bar 21 rearwardly and outwardly from said hollow base bar to enable the laprobe to be detached therefrom. The free end of the laprobe lock bar 21 is adapted to pass between the bars 15 and 16 of the end section $3^a$, is preferably broadened, as shown, and is provided with an opening $2^{'}2^a$ for engagement by a vertically-movable locking bolt 24, as hereinafter described. On the outer end of the end section $3^a$ of the hollow base bar is detachably secured a vertical casing 25 by means of bolts 26. Any suitable means may be employed to secure the casing 25 to the hollow base bar, and I do not limit myself in this particular. In the said casing 25 is a whip socket 27. Said casing has a horizontal partition plate 28 near its upper end and in rear of the whip socket, and the vertically-movable bolt 24 which locks the laprobe lock bar 21 operates in openings in said partition, in the end section $3^a$, and in the cross bars 15 and 16. A coiled extensile spring 29 is passed around the said bolt 24 and bears between the upper cross bar 16 and a pin or other projection 30, which extends from said bolt 24, serves to normally raise the latter to cause such bolt to release the locking bar 21, for the purpose hereinbefore described. In the upper edges of the sides of the casing 25 are recesses 31 to receive the reins, indicated at $a$. The said casing is partly covered by a fixed cover portion 32, which has an opening 33 above the whip socket to enable the whip to be placed in and removed from said socket. It is also provided with a cross opening 34, which intersects said opening 33. At the outer, upper corner of said casing 25 are shoulders 35, between which an opening 36 is formed, and under which is secured a lock 37 of any suitable construction, operated by any suitably-constructed key or other device 38, and the bolt 39 of which lock operates under the opening 36.

A lid 40 is hinged to the upper, outer side of the casing 25 to cover the shoulders 35, and is provided with a tongue 41 to enter the outer end of the opening 34 and with a spring-catch 42, to engage a flange 43 under one of the fixed cover portions 32 to lock said lid in a closed position. A button 44 is provided to release said spring-catch. Said lid 40 is provided on its inner side at the center of the space with a shoulder 45, which, when the lid is in a closed position, partly closes the opening 36. At the opposite end of the casing 25 from the lid 40 is a hinged lid 47, which is adapted to close the space in the upper end of said casing 25, above the partition 28. Said lid 47 has at its free end a tongue 48 to close the inner or rear end of the opening 34.

In the upper, inner end of the casing 25 is mounted a locking clamp 46 for the whip, indicated at $b$, said whip-locking clamp comprising a bar $48'$ and a pair of spring-arms 49 secured to said bar, and which project from the outer end thereof. The inner end of the said bar is pivoted on a bolt or other suitable pivoting device 50 which connects the front and rear sides of the casing 25, and from the underside of said bar projects a stud 51, which extends through openings in the reins or lines $a$, and when the said clamp is turned downwardly passes through an opening 52 in the partition 28 and serves to lock the lines. The inner end of the said stud projects from the upper side of the bar $48'$ and is headed and operates in a slot 53 in a spring guide 54, which is secured at one end to the hinged end of the lid 47. When the lid 47 is being closed, the clamping springs 46 must be closed manually against opposite sides of the whip, and the free outer ends of said clamping springs must be forced downwardly through the opening 36 and there locked by the lock 37, the bolt of which passes through the openings in the free ends of said clamping springs. As the clamping springs are thus forced down to and through the opening 36 they bear on the upper end of the bolt 24, which serves to lock the bar 21, and assuming that the said bar has been closed in the hollow base bar 1, said bolt 24 will be forced downwardly through the opening $22^a$ in said bar 21 to lock the same. The tension of the springs 17 against the inner side of the bar 21 is such as to cause such friction between said bar 21 and bolt 24 as to keep the latter in its lowered locking position, notwithstanding the spring 29. When it is desired to remove the lap robe $c$ the lids 40 and 47 must be first raised to release and move the whip-locking clamp upwardly and hence release the whip and also enable the lines or reins to be readily removed from the stud 51 and the bar 21 must then have its free outer end pressed forwardly sufficiently to cause said bar 21 to release the bolt 24, whereupon the spring 29 will raise said bolt 24 and cause the same to disengage said bar 21 and the spring 17 will then act to open said bar 21 and release said lap robe.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention, as defined by the appended claims.

Having thus described my invention, what I claim as new, and desire to secure by Letters-Patent, is,—

1. In a device of the class described, a casing having a hinged lid provided on its underside with a pin to enter openings in reins, when the lid is closed, the said casing serving to support said reins and coact with said lid and pin to lock them.

2. In a device of the class described, the combination of a base, a movable lap robe-locking bar to coact therewith to secure a robe between them, a bolt to lock said bar, a spring to resist the closing movement of said bar and cause the same to engage said bolt and hold the latter in locking position, and a spring to move said bolt to unlocking position when said bolt is relieved of the pressure of said bar caused by the first-mentioned spring.

3. In a device of the class described, in combination with a lap robe lock having a movable element, and a whip lock having a movable element, a locking bolt for the movable element of the lap robe lock, actuated by the movable element of the whip lock.

4. A lap robe locking device having a longitudinally adjustable base bar, for the purpose set forth.

5. A lap robe locking device having a longitudinally adjustable base bar comprising telescoping sections.

6. A lap robe locking device having a longitudinally adjustable base bar comprising a hollow inner section, and covering sections thereon and slidably related thereto.

7. In a device of the class described, in combination with a lap robe lock having a movable element, and a whip lock having a movable element, a locking bolt for the movable element of the whip lock, and a spring to normally move said locking bolt to unlocking position, said locking bolt being moved by said movable element of the whip lock into locking position, when said whip lock is closed.

8. In a device of the class described, the combination of a whip socket, a casing, a pivotally mounted whip-locking device movable toward and from the socket, means to secure said whip-locking device in a closed position, and means carried by said whip-locking device and coacting with the casing to secure the lines or reins.

9. In a device of the class described, the combination of a base, a casing, a laprobe-locking device coacting with the base to secure a robe, a whip socket, a whip-locking device movable toward and from the socket, means carried by said whip-locking device and coacting with the casing to secure the lines or reins, means to secure the said whip-locking device in a closed position, and means, operated by said whip-locking device to secure the lap robe locking device.

In testimony whereof I have hereunto set my hand in presence of two subscribing witnesses.

OTTO W. WILDE.

Witnesses:
JNO. M. MOON,
VERMILION HARRIS.